United States Patent Office 3,020,053
Patented Feb. 6, 1962

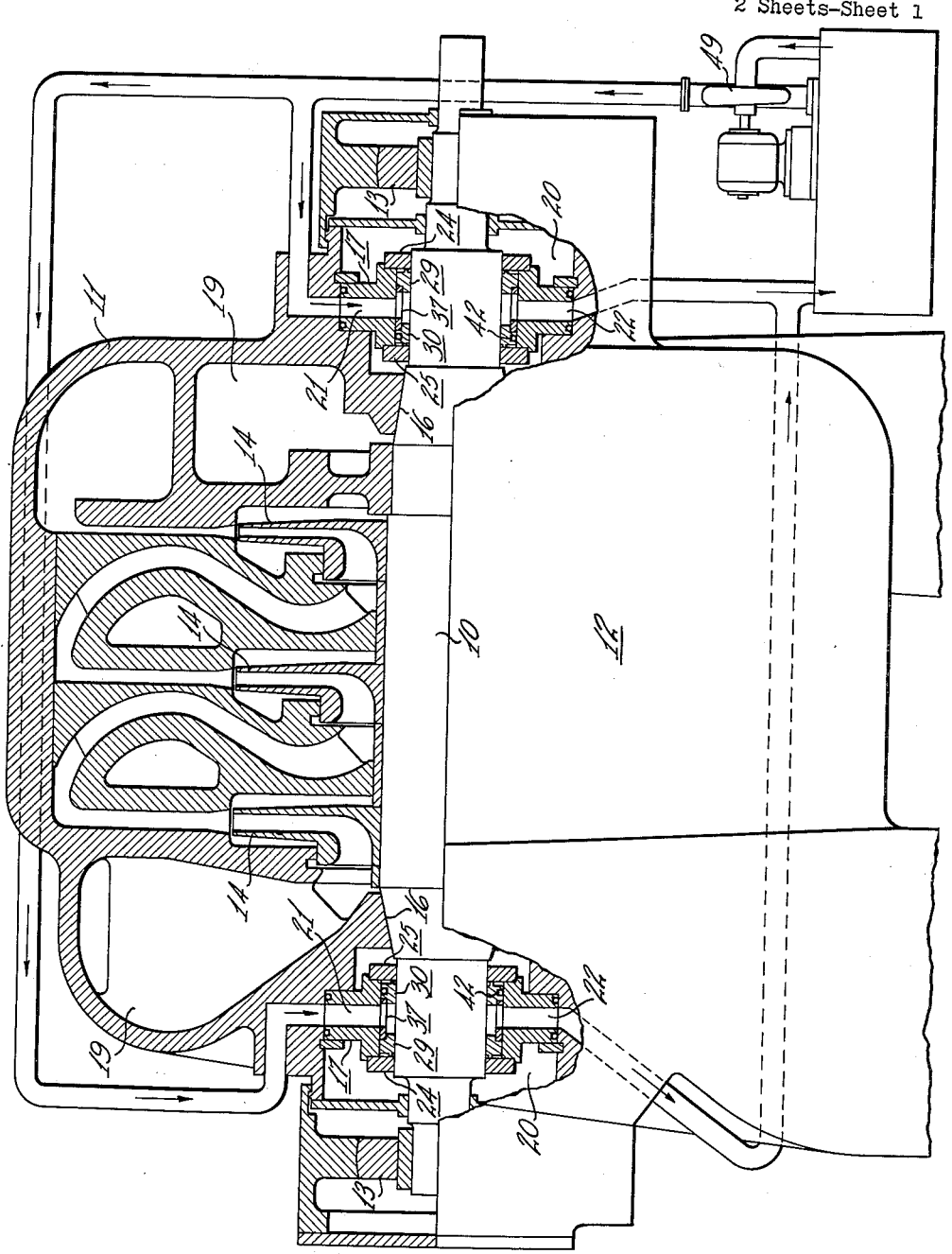

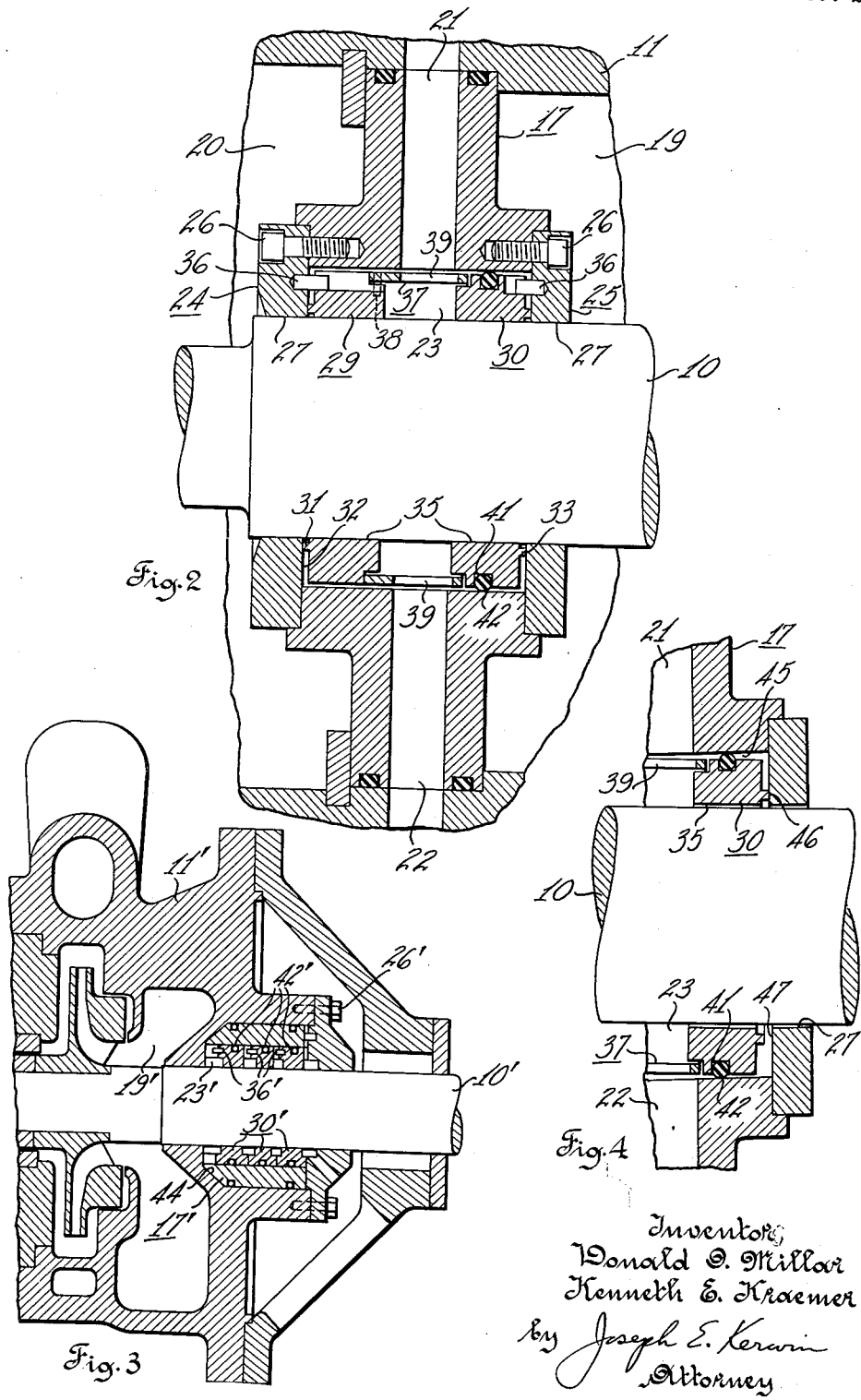

3,020,053
FLOATING BUSHING SEAL
Donald O. Millar and Kenneth E. Kraemer, Milwaukee, Wis., assignors to Allis-Chalmers Manufacturing Company, Milwaukee, Wis.
Filed Dec. 11, 1956, Ser. No. 627,679
3 Claims. (Cl. 277—137)

This invention relates to pressure seals for rotary shafts of an enclosed fluid filled machine casing such as floating bushing seals which are used between the shaft and the seal housing of compressors, blowers, pumps or the like, and particularly to such seals which use as a secondary seal a flexible positive sealing element or ring of resilient deformable material having a substantially circular radial cross section. The floating bushing seal is essentially a close clearance ring fitted over the shaft, retained in a seal housing so that it has freedom for radial and axial movement or freedom to float with any movement of the shaft.

Various proposals have been made for sealing such shafts, and among prior constructions, some have relied upon the oil buffered bushing type seals which are provided on each end of the fluid filled machine, where the shaft goes through the casing. The oil that is pressurized between two such bushings contained in the seal housing is maintained above the inlet pressure of the fluid filled machine casing, or over atmospheric pressure should the inlet pressure of the fluid in the machine casing be below atmospheric pressure, and thereby seals the fluid in the machine casing and provides for the flow of oil between the seal bushings to the machine casing through the narrow gap or clearance between the shaft and the inner bushing, and toward atmosphere through the outer bushing. The low rate of leakage is dependent upon very small clearances between the shaft and bushing that form the primary seal of the machine casing.

In prior constructions, a secondary seal consisting of a ground and lapped surface in contact with another ground and lapped surface is maintained. The face plates, which are the end walls of the aperture of the seal housing and the bushings disposed in the housing aperture, are arranged to form the secondary seal. In order to have the secondary seal operate as a seal, the ground and lapped surface consists of a dam on the bushing and must always be in full contact with the face plate. The leakage across the contact faces is practically zero if proper alignment of the bushing and the face plate is maintained. Statically this is no problem since both faces are machined to almost perfect flatness, assuring proper contact. However, to maintain this full contact between the contacting faces to provide a fluid tight seal requires the face plate to always be perpendicular to the center line of the shaft. Offhand this does not seem a difficult problem; actually it is practically impossible to maintain the true perpendicular relationship.

The perpendicularity of the face plate is itself dependent upon several other parts. The face plate is usually bolted to the seal housing which in turn is fitted to the casing. Failure to properly align any of these parts will result in the nonperpendicularity of the face plate to the shaft center line. Also, misalignment or deflection of the shaft further complicates the possibility of perpendicularity to the face plates, resulting in leakage between the contacting surfaces of the face plate and bushing. Without perfect alignment, in actual operation due to the hydrodynamic forces in the oil between the shaft and the bushing, the center line of the bushing will move and become coaxial with the center line of the shaft braking the full contact between the face plate and the bushing dam.

It is, therefore, advantageous if the necessity of true perpendicularity of the shaft and face plate be eliminated, while still retaining zero secondary leakage. Since the primary cause of the bushing not making full contact with the face plate is the nonperpendicularity of the face plate to the shaft acting in conjunction with the bushing reacting to hydrodynamic action, it is an object of this invention to utilize this action to resolve the resulting secondary leakage.

Generally, an object of the invention is to provide an improved seal of the character indicated, that is relatively inexpensive because of greater allowable machining tolerances.

More specifically, an object of the invention is to provide an improved seal of the character indicated, which is a simple and compact, positive sealing device for the shaft of a rotary machine, so constructed and arranged as to be unaffected by whipping, flexing, thrusts or vibrations imparted to the rotating shaft during operation.

Another object of the invention is to provide an improved seal of the character indicated which avoids certain undesirable performance characteristics of the seals for shafts hereinbefore mentioned.

The foregoing and other objects and advantages will be apparent from the description herein explained in conjunction with the accompanying drawings, in which:

FIG. 1 is a side elevation partially in section of a turboblower, showing in conjunction therewith a pressure seal in accordance with the instant invention;

FIG. 2 is a detail showing of the pressure seal in section;

FIG. 3 is a partial section of a centrifugal pump showing a modified embodiment of the pressure seal;

FIG. 4 is a view similar to FIG. 2 showing a shaft in a deflected or misaligned condition within the sealing unit.

In the drawings, reference numeral 10 identifies a rotor shaft which passes out of the ends of the closed casing 11 of a machine 12, such as the turboblower shown in FIG. 1, the shaft 10 being supported by the external load bearings 13 as shown. The rotor element 14 as illustrated may be of any desired construction in accordance with the character of the machine, but it is to be understood that the closed casing 11 contains a fluid, under some degree of positive or negative pressure.

The shaft 10 extends through an opening 16 at the ends of the machine casing 11. A seal housing 17 (seen best in FIG. 2) secured to the casing separates the gas filled chamber 19 under pressure from an outer chamber 20, which contains air at atmospheric pressure. The seal housing has an oil inlet passage 21 and an oil outlet passage 22. Separating the oil passages is an annular shaped housing aperture 23 formed by the seal housing 17 and shaft 10, enclosed by inwardly extending members or face plates 24 and 25 detachably connected by cap screws 26 to the seal housing. The face plates each have a circular opening 27 through which the shaft passes with a predetermined clearance, seen in FIG. 4.

Disposed within each housing aperture as shown in FIG. 2 are bushings, or close clearance rings, 29 and 30. The outer bushing 29 has a continuous ground and lapped dam projection on one face 31 which endeavors to attain a fluid tight contact with the inner ground and lapped surface 32 of the outer face plate 24 which separates the housing aperture 23 from atmosphere 20. Any leakage through this outer bushing seal is not objectionable, since a considerable amount of recirculated oil to atmosphere is necessary to remove heat generated by the seal. The inner bushing 30 also has a projection on one face, but it is not continuous or required to be ground and lapped and is utilized only as an axial locating point 33. The locating point is, in effect, an edge in pivotal contact with the inner surface of the inner face plate 25 which separates the housing aperture 23 from the gas filled chamber 19 of the machine. The pressurized fluid, such as oil, within the seal housing forces the bushing 30 against the inner face plate 25, the bushing contacting the face plate through the axial locating point 33 and pivoting on the face plate relative to any position of the shaft.

Both of the bushings 29 and 30 have an inner bore through which the shaft extends with a predetermined clearance 35 (FIG. 4), less than the predetermined clearance 27 between the face plates and shaft. The bushings have an outside diameter less than the diameter of the housing aperture, with a sufficient clearance 45 between the bushings and the seal housing to allow for the free radial movement of the bushing as it follows the shaft. Nonrotation pins 36 are placed between the bushings and their respective face plates preventing the rotation of the bushings while not preventing relative radial and axial movement of the bushings in the housing aperture.

A spacer ring 37 separating the two bushings is interposed within the housing aperture between the inner and outer bushings, with a pin 38 inserted between the spacer ring 37 and the outer bushing 29 to prevent rotation of the spacer. Holes 39 in the spacer ring are aligned with the inlet and outlet oil passages for the flow of the oil through the seal housing and housing aperture. In the buffered double bushing type seal, the spacer ring 37 may be eliminated by making the two bushings integral, drilling a hole through the center portion of the cylindrical surface and aligning the hole with the inlet and outlet fluid passage of the seal housing.

The inner bushing 30 has a circumferential groove 41 in its outer surface. A ring of resilient deformable material having a substantially circular radial cross section, such as the O-ring 42 of a rubber like material is partially disposed in the groove 41. The O-ring before placement in the groove has a static inner diameter less than the diameter of the groove, and therefore must be prestretched for placement within the groove. The static outer diameter of the O-ring is greater than the diameter of the housing aperture 23, resulting in the compression of the O-ring between the bushing and the seal housing. While in the compressed state the O-ring diameter is still greater than the clearance 45 between the bushing 30 and the seal housing 17.

While the bushing arrangement illustrated in FIGS. 1 and 2 affords an adequate shaft seal for some applications, a plurality of the bushings 30' with O-rings 42' may be arranged in series along the shaft 10', as in FIG. 3, to step down in stages a high internal pressure 19' within the machine casing 11'. As shown in FIG. 3, three of the bushings with O-rings are disposed within the seal housing 17'. Pins 36' are inserted in a clearance slot, between the casing 11' and the first bushing 30' and between each two adjacent bushings to prevent rotation thereof but to allow for radial movement of the bushings within the housing aperture 23'. Cap screws 26' are provided, and where attendance and servicing are required easy accessibility is thereby allowed. The sealing members are easily replaced when worn, by inserting a new unit in place of the worn unit within the retainer 44 of the casing.

In operation of the floating bushing seal with respect to the shaft 10, oil under pressure is passed through the inlet oil passage 21 of the seal housing 17. The pressure of the oil in the seal housing 17 is sufficiently greater than the pressure of the fluid in the machine casing 11 to assure proper sealing of the fluid in the casing and provide the means for causing the oil to pass through the gap or clearance 35 between the shaft and the bushing toward the fluid filled machine casing.

If the center line of the seal housing is not parallel to the center line of the shaft as shown in FIG. 4, under static conditions the bushing 30 may be in contact with the face plate and there will be no clearance at either point 46 or 47. Due to the misalignment of the shaft 10, the bushing 30 may even rest on the shaft, but upon shaft rotation the bushing will immediately lift off the shaft because of the hydrodynamic forces in the oil between the shaft and bushing, and the bushing will become coaxial with the shaft pivoting about point 46 if the misalignment or deflection of the shaft is as shown in FIG. 4. The bushing will then leave the face plate at point 47 and allow leakage past the contacting surfaces except for the placement of O-ring 42 in the circumferential groove 41 of the bushing 30. With the seal arrangement and O-ring the eccentricity of the shaft center line and the seal housing center line is taken up in the squeeze of the O-ring, since the hydrodynamic forces in the oil between the shaft and bushing will exceed by far the forces and couples which the O-ring can exert. Thus, the bushing 30 will be essentially concentric with the shaft 10 although eccentric with the seal housing 17, and yet the O-ring 42 maintains a positive secondary seal between the bushing and the seal housing, in effect eliminating all secondary leakage between the inner bushing 30 and the gas filled chamber 19. Although bushing 29 still relies on the ground and lapped surfaces to establish the secondary seal, any oil leakage past the secondary seal, caused by the misalignment of the shaft, that enters the atmospheric chamber 20 is returned to suction of the booster pump 49 and is refed through the inlet oil passage 21 of the seal housing 17.

As shown in FIG. 3, the fluid under pressure 19' within a pump casing 11' is utilized and passes through the seal housing 17' along the shaft 10' providing the necessary lubrication and required film between the shaft and bushing.

In essence, the operation of the bushing 30 with the O-ring 42 positioned in the bushing's circumferential groove 41, provides for restricting some of the pressurized fluid that passes through the seal housing 17 into the predetermined clearance 35 between the shaft 10 and the bushing 30. The pressurized fluid seals the fluid filled chamber 19 of the machine casing 11, and also provides the necessary lubrication required.

Therefore, a restricted flow of oil is maintained around the shaft to lubricate the shaft and maintain a primary seal around the shaft regardless of deflection or misalignment of the shaft since the hydrodynamic forces permit the bushing to follow the shaft against the friction of the secondary seal provided by the O-ring 42. The O-ring 42, coacting with the movement of the bushing 30 as it aligns in accordance with any deflection or misalignment of the shaft 10, provides a positive secondary seal between the bushing 30 and the seal housing 17.

While the form of embodiment of the invention as herein disclosed constitutes a preferred form, it is to be understood that other forms might be adopted, all coming within the scope of the claims which follow.

What is claimed is:

1. A pressure seal comprising a seal housing having an aperture enclosed by inwardly extending members, each of said members having an opening, a shaft extending through said openings with a first predetermined clearance, a bushing within said seal housing aperture and having an inner bore through which said shaft extends with a second predetermined clearance less than said first predetermined clearance, said second predetermined clearance between said bushing and said shaft providing a primary seal, said bushing having an outside diameter less than the diameter of said housing aperture, said bushing having an axially extending projection spaced radially outward from said bushing bore on the side of said bushing facing pressure to be sealed, said bushing being axially spaced from said inwardly extending members except for said projection which engages one of said inwardly extending members to permit said bushing to pivot relative to said inwardly extending member in response to deflections of said shaft, means nonrotatably fastening said bushing to one of said inwardly extending members and permitting relative radial and axial movement between the bushing and seal housing, said bushing having a circumferential groove in its outer surface, a resilient sealing ring having a static inner diameter less than the diameter of said groove and being stretched and partially disposed within said groove and having an outer static diameter greater than the diameter of said housing aperture and compressed and confined within said housing aperture, said resilient sealing ring providing an adjustable positive secondary seal between said seal housing and said bushing in response to relative pivotal movements of said bushing about said projection contact point and said shaft restricting the flow of pressurized fluid through said primary seal.

2. A pressure seal comprising a seal housing having an aperture enclosed by inwardly extending members, a pressurized fluid within said seal housing, each of said members having an opening, a shaft extending through said openings with a first predetermined clearance, an O-ring and a bushing disposed within said aperture, said bushing having an inner bore through which said shaft extends with a second predetermined clearance less than said first predetermined clearance, said second predetermined clearance between said bushing and said shaft providing a primary seal, said bushing having an outside diameter less than the diameter of said aperture and having a circumferential groove in the outer surface, said bushing having an axially extending projection spaced radially outward from said bushing bore on the side of said bushing facing pressure to be sealed, said bushing being axially spaced from said inwardly extending members except for said projection which engages one of said inwardly extending members to permit said bushing to pivot relative to said inwardly extending member in response to deflections of said shaft, said O-ring having a static inner diameter less than the diameter of said groove and being stretched and partially disposed within said groove and having an outer static diameter greater than the diameter of said aperture, said O-ring compressed and confined within said housing aperture to provide an adjustable positive secondary seal between said seal housing and said bushing in response to relative pivotal movements of said bushing about said projection contact point and said shaft, said pressurized fluid forcing the bushing against one of said inwardly extending members, said bushing in response to movements of said shaft restricting the flow of pressurized fluid through said primary seal.

3. A pressure seal for use with rotary shafts of an enclosed fluid filled machine casing, said pressure seal comprising a seal housing having an annular aperture enclosed by inwardly extending members, each of said inwardly extending members having an opening, a shaft extending through said openings with a first predetermined clearance, two or more bushings in series fitted over the shaft and retained within the seal housing, a bushing in said series of bushings facing the pressure to be sealed having a projection axially extending from said bushing and radially spaced outward from said bushing on said side facing the pressure to be sealed, said bushing being axially spaced from said inwardly extending members except for said projection which engages one of said members to permit said bushing to pivot relative to said member in response to deflections of said shaft, said bushings having an inner bore through which said shaft extends with a second predetermined clearance less than said first predetermined clearance, said second predetermined clearance between said bushings and said shaft providing a primary seal, said bushings having an outside diameter less than the diameter of said aperture, means nonrotatably fastening said bushings to each other and to said inwardly extending members permitting relative radial movement between the bushings and seal housing; said bushings having a circumferential groove in the outer surface, a resilient sealing ring being partially disposed in each of said grooves, said resilient rings having a static inner diameter less than the diameter of said grooves and having an outer static diameter greater than the diameter of the housing aperture, said resilient rings being compressed and confined within said housing aperture providing a positive secondary seal between said seal housing and bushing adjustable in response to relative pivotal movements of said bushing about said projection contact point and the shaft with the bushing coacting with the shaft providing a restricted uniform film flow of fluid through said primary seal.

References Cited in the file of this patent

UNITED STATES PATENTS

| | | |
|---|---|---|
| 1,058,075 | London | Apr. 8, 1913 |
| 1,572,922 | Govers et al. | Feb. 16, 1926 |
| 2,186,537 | Salisbury | Jan. 9, 1940 |
| 2,366,629 | Kohler | Jan. 2, 1945 |
| 2,531,079 | Payne | Nov. 21, 1950 |
| 2,555,492 | Kidney | June 5, 1951 |
| 2,621,087 | Kluge | Dec. 9, 1952 |
| 2,634,990 | Fink | Apr. 14, 1953 |
| 2,742,306 | Kelso | Apr. 17, 1956 |
| 2,761,709 | Gilbert | Sept. 4, 1956 |